Dec. 9, 1924.
H. W. MUHLEISEN
TAKE-UP BRAKE
Original Filed May 24, 1922
1,518,598
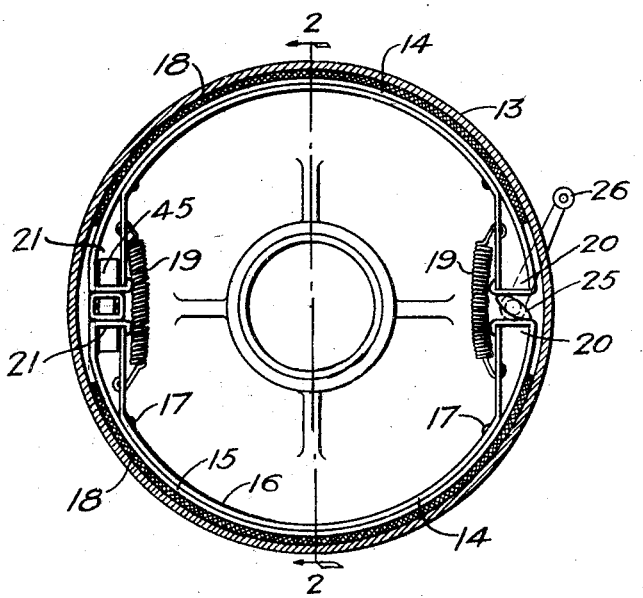
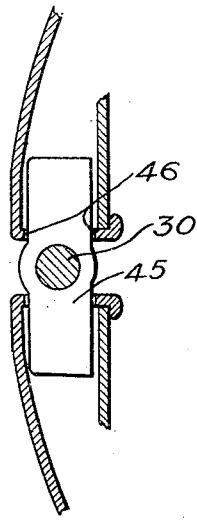
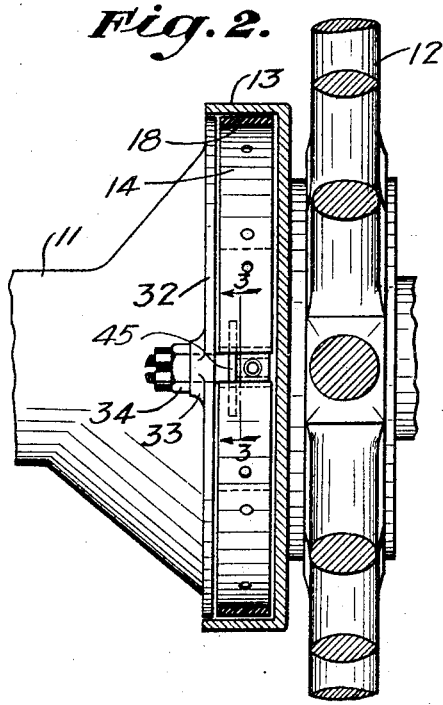
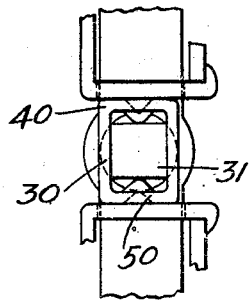
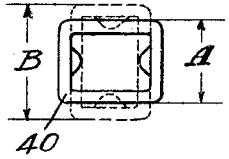
INVENTOR:
HENRY W. MUHLEISEN,
BY
Graham + Harris
ATTORNEYS.

Patented Dec. 9, 1924.

1,518,598

UNITED STATES PATENT OFFICE.

HENRY W. MUHLEISEN, OF LOS ANGELES, CALIFORNIA, ASSIGNOR, BY DIRECT AND MESNE ASSIGNMENTS, TO W. S. RUSH & CO., A COPARTNERSHIP COMPOSED OF W. S. RUSH, E. S. RUSH, AND B. C. GRAVES, ALL OF LOS ANGELES, CALIFORNIA.

TAKE-UP BRAKE.

Application filed May 24, 1922, Serial No. 568,259. Renewed October 8, 1924.

*To all whom it may concern:*

Be it known that I, HENRY W. MUH-LEISEN, a citizen of the United States, residing at Los Angeles, in the county of Los Angeles, State of California, have invented a new and useful Take-Up Brake, of which the following is a specification.

My invention relates to brakes, and more particularly to the brake which is adapted to be applied to the standard form of Ford automobiles.

The principal object of my invention is to provide a brake for a Ford automobile which is so constructed that after the brake has become partially worn, the brake can be readjusted to bring back its full condition of efficiency.

A further object of the invention is to provide a novel adjusting means for taking up the wear of the brake shoes.

Further objects and advantages will appear hereinafter from the following description and drawings.

Referring to the drawings, which are for illustrative purposes only,

Fig. 1 is a side elevation of a preferred embodiment of my invention.

Fig. 2 is an elevation partially in section on a plane represented by the line 2—2 of Fig. 1.

Fig. 3 is a section on an enlarged scale on a plane represented by the line 3—3 of Fig. 2.

Fig. 4 is a view showing the adjusting ends of the shoes, and,

Fig. 5 is a diagram showing two positions of the brake adjusting sleeve.

In the form of the invention shown, 11 is an axle housing which is stationary and which carries an axle not shown which drives the wheel 12. Carried by the wheel 12 is a brake drum 13 which has an inner cylindrical surface against which the brake shoes 14 are expanded.

These brake shoes, as illustrated, each consist of two pieces of strap iron 15 and 16 secured together by rivets 17. Brake lining 18 is secured to the outer surface of the shoes 14 for the purpose of increasing the coefficient of friction.. Tension springs 19 are secured between the brake shoes, as shown, these springs tending to pull the setting ends 20 and the adjusting ends 21 of the shoes together so that the shoes will not make contact with the inner surface of the drum 13 when the brake is released.

Projecting into the space between the setting ends 20 of the shoes 14 is the standard cam 25 which is operated by a brake lever 26 which is connected to suitable means controlled by the driver of the automobile. By exerting pressure on the end of the lever 26, the brake cam may be turned, thus forcing the setting ends 20 of the shoes 14 apart so that the brake lining 18 frictionally engages the inside of the drum 13. The parts 25 and 26 are standard equipment on Ford cars and form no part of this invention.

Projecting into the space between the adjusting ends 21 is a pin 30 which may have a square end, as shown at 31 in Fig. 4, this pin having a shoulder bearing against a plate 32 of the axle housing 11. The pin is threaded in a boss 33 in the housing and may be secured from turning therein by means of a lock nut 34.

I provide a sleeve 40 which is preferably formed of seamless tubing and which has two dimensions, A and B, as shown in Fig. 5, which shows this sleeve 40 in two positions, one in full lines and the other dotted. It will be noted that in Fig. 1 the sleeve 40 is in the position corresponding to the full line position in Fig. 5 and that the dimension A represents the distance between the adjusting ends 21 of the brake shoe 14. It will be further noted that the sides of the sleeve 40 are flattened so that it tends to remain in this position. This is the initial position of this sleeve when the brake is first put in use and the brake lining 18 is new.

I also provide a guide 45, best shown in Fig. 3, this guide pivoted upon the pin 30 and projecting into slots 46 formed in the adjusting ends 21 of the brake shoes 14. This guide tends to keep the two adjusting ends 21 in alinement with each other and thus insure an even wearing of the brake surfaces.

After the brake has been operated for a certain period, the brake lining 18 becomes worn. For the purpose of taking up this wear, the sleeve 40 may be taken off the pin 30 and secured thereon in the position shown in Fig. 4 which corresponds to the dotted line position in Fig. 5, the distance between the adjusting ends 21 of the brake shoe 14 then being equal to the distance B. Indentations 50 are provided in the sides of the sleeve 40 to hold it centrally on the pin 30. When in the position shown in Fig. 4, it will be noted that the adjusting ends 21 of the brake shoes are held further apart than in the position shown in Fig. 1 and that the brake may then be operated until the brake linings 18 are entirely worn out.

I claim as my invention:

1. In a brake, the combination of: a brake drum; two shoes inside said brake drum, each shoe having an adjusting end and a setting end, the adjusting end of one shoe being adjacent to the adjusting end of the other shoe and the setting end of one shoe being adjacent to the setting end of the other shoe; means by which the setting ends of the shoes may be forced apart; a pin projecting into the space between the adjusting ends of said shoes; and a rectangular block carried on said pin to be turned into either of two positions so that either its sides or its ends may engage said adjusting ends of said shoes to adjust the brake.

2. In a brake, the combination of: a brake drum; two shoes inside said brake drum, each shoe having an adjusting end and a setting end, the adjusting end of one shoe being adjacent to the adjusting end of the other shoe and the setting end of one shoe being adjacent to the setting end of the other shoe; means by which the setting ends of the shoes may be forced apart; a pin projecting into the space between the adjusting ends of said shoes, and an adjusting block carried on said pin to be turned into either of two positions to adjust the brake, said block being so shaped with relation to said adjusting ends of said shoes that it will remain independently in either position when once set.

3. In a brake, the combination of: a brake drum; two shoes inside said brake drum, each shoe having an adjusting end and a setting end, the adjusting end of one shoe being adjacent to the adjusting end of the other shoe and the setting end of one shoe being adjacent to the setting end of the other shoe; means by which the setting ends of the shoes may be forced apart; a pin projecting into the space between the adjusting ends of said shoes; an adjusting block carried on said pin to be turned into either of two positions to adjust the brake; and a guiding member fitting on said pin and extending through slots in said adjusting ends of said shoes.

4. In a brake, the combination of: a brake drum; two shoes inside said brake drum, each shoe having an adjusting end and a setting end, the adjusting end of one shoe being adjacent to the adjusting end of the other shoe and the setting end of one shoe being adjacent to the setting end of the other shoe; means by which the setting ends of the shoes may be forced apart; a pin projecting into the space between the adjusting ends of said shoes; an adjusting block carried on said pin to be turned into either of two positions to adjust the brake, said block being so shaped with relation to said adjusting ends of said shoes that it will remain independently in either position when once set; and a guiding member for maintaining said adjusting ends of said shoes in operative relation.

In testimony whereof, I have hereunto set my hand at Los Angeles, California, this 19th day of May, 1922.

HENRY W. MUHLEISEN.